United States Patent [19]

Misawa et al.

[11] Patent Number: 5,282,044
[45] Date of Patent: Jan. 25, 1994

[54] CAMERA SHAKE CORRECTION SYSTEM

[75] Inventors: Atsushi Misawa; Satoshi Ueda, both of Tokyo, Japan

[73] Assignee: Fuji Photo Film Co., Ltd., Kanagawa, Japan

[21] Appl. No.: 757,415

[22] Filed: Sep. 10, 1991

[30] Foreign Application Priority Data

| Oct. 18, 1990 | [JP] | Japan | 2-280141 |
| Oct. 18, 1990 | [JP] | Japan | 2-280142 |
| Oct. 18, 1990 | [JP] | Japan | 2-280143 |
| Oct. 18, 1990 | [JP] | Japan | 2-280144 |
| Aug. 1, 1991 | [JP] | Japan | 3-193067 |

[51] Int. Cl.$^5$ .......................................... H01N 5/228
[52] U.S. Cl. ................................. 358/222; 358/209; 354/70
[58] Field of Search ............. 358/222, 105, 909, 209; 354/70; 359/554; H04N 5/225, 5/228

[56] References Cited

U.S. PATENT DOCUMENTS

| 4,717,958 | 1/1988 | Gal et al. ...................... 358/222 |
| 4,788,596 | 11/1988 | Kawakami et al. .............. 358/222 |
| 5,012,270 | 4/1991 | Sekine et al. .................. 358/222 |
| 5,012,347 | 4/1991 | Fournier ....................... 358/222 |
| 5,020,890 | 6/1991 | Oshima et al. ................. 358/222 |

FOREIGN PATENT DOCUMENTS

| 0132109 | 1/1985 | European Pat. Off. ...... H04N 5/225 |
| 0206668 | 12/1986 | European Pat. Off. ...... H04N 5/225 |
| 0358196 | 3/1990 | European Pat. Off. ...... G02B 27/64 |
| 61-191171 | 8/1986 | Japan ........................... H04N 5/222 |
| 63-36677 | 2/1988 | Japan ........................... H04N 5/335 |
| 1-78581 | 3/1989 | Japan ........................... H04N 5/232 |
| 1-109970 | 4/1989 | Japan ........................... H04N 5/217 |
| 1-119177 | 5/1989 | Japan ........................... H04N 5/217 |
| 2-170681 | 2/1990 | Japan ........................... H04N 5/232 |
| 2-75284 | 3/1990 | Japan ........................... H01N 5/232 |
| 20-111179 | 4/1990 | Japan ........................... H04N 5/232 |
| 3-096931 | 4/1991 | Japan ........................... H04N 5/00 |
| 3-117278 | 5/1991 | Japan ........................... H04N 5/232 |
| 1015916 | 1/1966 | United Kingdom ........ H04N 5/225 |

OTHER PUBLICATIONS

Patents Abstracts of Japan, vol. 13, No. 301 (E-785)[3649]Jul. 11, 1989 (JP-A-1 078581).
Patent Abstracts of Japan, vol. 14, No. 437 (E-980) Jul. 2, 1990 (JP-A-2 170 681).
Patent Abstracts of Japan, vol. 11, No. 020 (E-472) Jan. 20, 1987 (JP-A-61 191 171).
Patent Abstracts of Japan, vol. 12, No. 250 (E-633) Jul. 14, 1988 (JP-A-63 036 677).
Patent Abstracts of Japan, vol. 14, No. 255 (E-935)(4198) May 31, 1990 (JP-A-2 075 284).
Patent Abstracts of Japan, vol. 13, No. 359 (E-804)(3707) Aug. 10, 1989 (JP-A-1 119 177).
Patent Abstracts of Japan, vol. 13, No. 350 (E-800)(3698) Aug. 7, 1989 (JP-A-1 109 970).
Patent Abstracts of Japan, vol. 14, No. 328 (E-952)(4271) Jul. 13, 1990 (JP-A-3 111 179).
Patent Abstracts of Japan, vol. 15, No. 319 (E-1100) Aug. 14, 1991 (JP-A-3 117 278).
Patent Abstracts of Japan, vol. 15, No. 281 (P-1228) Jul. 17, 1991 (JP-A-3 096 931).

*Primary Examiner*—Richard E. Chilcot, Jr.
*Assistant Examiner*—Tuan V. Ho
*Attorney, Agent, or Firm*—Sughrue, Mion, Zinn, Macpeak & Seas

[57] ABSTRACT

A camera shake correction system which uses a combination, of electronic and mechanical camera shake correction devices so as to be able to realize an excellent camera shake correction. The camera shake correction system includes a mechanical camera shake correction part as well as an electronic camera shake correction part. The mechanical camera shake correction sensor uses as a camera shake sensor a picture image sensor used in the electronic camera shake correction part, thereby eliminating the use of an expensive angular velocity sensor. On the other hand, when an angular velocity sensor is used, the zero angular velocity detected by the picture image sensor is used to set the off-set voltage of the angular velocity sensor. Also, at least one of the following, tilting and panning operations of a camera is decided in accordance with the output of the picture image sensor or the outputs of the picture image sensor and angular velocity sensor, the electronic and mechanical camera shake correction parts that are suitable for the operation decided are controlled. Further, by proper or selective use of the electronic and mechanical camera shake correction parts in accordance with the magnitude of angular velocities, the mutually weak corrections of two parts can be made up for and the waste of the power consumption can be avoided.

8 Claims, 10 Drawing Sheets

CAMERA SHAKE CORRECTION SYSTEM

BACKGROUND OF THE INVENTION

1. Field of the Invention

The present invention relates to a camera shake correction system and, in particular, to such camera shake correction system which combines an electronic camera shake correction means and a mechanical camera shake correction system.

2. Description of the Related Art

Conventionally, there has been known an electronic camera shake correction system which processes a picture image obtained from an image pickup means in a digital signal to thereby correct the amount of movement of a screen. In this type of electronic camera shake correction system, the predetermined areas of image data between fields are compared with each other to find a mutual relation therebetween to thereby detect the amount of parallel movement of a following image with respect to a leading image, and the image to be output is shifted by the thus detected amount of parallel movement in the opposite direction (Japanese Patent Publication (Tokkai) No. 1-109970).

On the other hand, as a mechanical camera shake correction system, there has been known a system in which there is inclinably arranged a correction mirror having an angle of about 45° with respect to the optical axis of a taking lens, and the correction mirror is driven to stabilize the light of an object incident onto an image pickup surface through the correction mirror and taking lens, or a system in which the whole of a taking lens or at least one of a plurality of lenses forming the taking lens is inclinably supported by a gimbal mechanism or the like, and the supported lens is driven to stabilize the object light incident onto the image pickup surface.

Also, as an angular velocity sensor which can be used in this type of mechanical camera shake correction system to detect the shake of a camera, there is generally known a sensor which utilizes a Coriolis force. This angular velocity sensor outputs a voltage signal proportional to an angular velocity. However, in this angular velocity sensor, in order to obtain an absolute angular velocity, it is necessary to detect an output value obtained at the time when the angular velocity is 0 (that is, the central value voltage of the sensor) and then to subtract the central value voltage from the sensor output.

Referring back to the above-mentioned conventional electronic camera shake correction system, it is inexpensive because it does not use any mechanical sensor such as an angular velocity sensor or the like. Also, since the correction system employs a signal post-process method using a field memory, it is free from delay and is able to correct the camera shake with high accuracy. However, due to the fact that a picture having a predetermined size but smaller than an input picture is cut out from the input picture according to the detected amount of parallel movement and the thus cut screen is then enlarged up to the same size of the input picture before it is output, the number of effective pixels is reduced. For this reason, according to the conventional electronic camera shake correction system, in order to prevent the deterioration of picture quality due to such reduction of the number of the effective pixels, the size of the picture to be cut out is normally limited to the order of 90% of the input picture, with the result that the correction can be made only within a range of 10% or so with respect to the input picture. This means that the limit of the camera shake correction is 1° if a picture angle in photographing is, for example, 10°, that is, a sufficient camera shake correction effect cannot be achieved.

Also, when an angular velocity sensor is used, as a method of detecting the output value obtained when the angular velocity of the angular velocity sensor is 0, there have been proposed several methods. In one of them, the average value of the sensor outputs for a long period of time is calculated to thereby detect the above-mentioned output value. In another one of them, the variations of the angular velocity are followed, a stationary state is checked according to the characteristics of the angular velocity variations, and the above-mentioned output value is detected from the then output value. However, because all of the methods are based on the output of the angular velocity sensor, there is the possibility of mis-detection. Also, there is known the fact that the sensor outpull of the angular velocity sensor includes a drift component which has no connection with the angular velocity, and this drift component makes it difficult to detect the angular velocity with accuracy.

Also, conventionally, there has never been proposed such camera shake correction system that combines an electronic camera shake correction device with a mechanical camera shake correction device. None of the conventional camera shake correction systems can distinguish the panning operation or tilting operation of a camera from the operation of following an object. As a result of this, the camera shake correction is executed without confirming which of the operations is required and, therefore, an unnatural picture is inevitably produced. For example, if the camera is panned while the electronic camera shake correction system is kept operable, then the picture is stopped within a range that can be corrected by the electronic camera shake correction system, and if the correctable range is over, then the picture is instantaneously moved and is stopped again; such moving and stopping motions are repeated to provide an intermittently moving picture. On the other hand, if the camera is panned while the mechanical camera shake correction system is kept operable, then the camera shake correction is limited by the movable range of the optical members of the mechanical camera shake correction system; that is, the picture is stopped only in the early panning operation, and after then, the shake correction is possible only in one direction because the optical members are brought into contact with a mechanical stopper.

Therefore, in order to avoid the above-mentioned unnatural picture, a photographer must judge the above-mentioned photographing conditions and remove the camera shake correction, which provides a complicated operation.

Further, the mechanical camera shake correction system uses an angular velocity sensor utilizing a Coriolis force. This angular velocity sensor is not able to detect a small angular velocity (1°/sec. or smaller) because the Coriolis force of the sensor itself is small and, therefore, the angular velocity sensor is not able to correct a small angular velocity movement (that is, a slow movement). On the other hand, when the amount of the movement of the picture is detected from the image data in the electronic camera shake correction system, a slight angular velocity can be detected but a large angular velocity cannot be detected.

SUMMARY OF THE INVENTION

The present invention aims at eliminating the drawbacks found in the above-mentioned conventional camera shake correction systems.

Accordingly, it is an object of the invention to provide a camera shake correction system which holds the strong points of an electronic camera shake correction system, provides a greater camera shake correctable range than the conventional electronic camera shake correction system, and is free from deteriorated image quality.

It is another object of the invention to provide a camera shake correction system which can judge accurately the state of the angular velocity 0 of an angular velocity sensor used in a mechanical camera shake correction system to thereby provide a more highly accurate detection of the angular velocity, and thus can realize a highly accurate camera shake correction.

It is yet another object of the invention to provide a camera shake correction system which is capable of electronic and mechanical camera shake corrections and is also capable of distinguishing the following, tilting, panning and other similar operations of a camera from one another.

It is still another object of the invention to provide a camera shake correction system which is capable of using electronic and mechanical camera shake correction systems properly to perform the respective weak operations of the electronic and mechanical camera shake correction systems, while holding the strong points of the two systems.

In order to achieve the above objects, according to the invention, there is provided a camera shake correction system which comprises an picture image sensor for detecting the amount of parallel movements of a following picture image with respect to a leading picture image in accordance with picture image data between respective fields or part of such picture image data, electronic camera shake correction means for moving parallel a picture image to be output in the opposite direction by the amount of the parallel movements detected by the above-mentioned picture image sensor, and mechanical camera shake correction means for driving at least one of a plurality of optical members of a photographing optical system of a camera in accordance with the output of the above image sensor, the one of optical members being disposed in a freely movable manner.

Also, in order to attain the above objects, according to the invention, there is provided a camera shake correction system which comprises an angular velocity sensor which, if an angular velocity obtained when a camera is shaken is applied thereto, then outputs a signal proportional to the applied angular velocity, decision means for detecting the amount of parallel movements per unit time of a following picture image with respect to a leading picture image in accordance with image data between fields or part of such data to decide in accordance with the detected amount of parallel movements whether the angular velocity of the camera is 0 or not, correcting means for setting as an off-set signal the output signal of the above-mentioned angular velocity sensor output at the time when the angular velocity is decided as 0 by the angular velocity zero decision means to correct the output signal of the angular velocity sensor by means of the off-set signal, and mechanical camera shake correction means for, in accordance with the output of the correcting means, driving at least one of a plurality of optical members of a photographing system of the camera, the one of a plurality of optical members being arranged so as to be freely movable.

Further, in order to accomplish the above objects, according to the invention, there is provided a camera shake correction system which comprises a picture image sensor for detecting the amount of parallel movements of a following picture image with respect to a leading picture image in accordance with picture image data between fields or part of such picture image data, electronic camera shake correction means for moving parallel a picture image to be output by the amount of parallel movements detected by the above picture image sensor in the opposite direction, an angular velocity sensor which, if an angular velocity prod d with the shake of a camera is applied thereto, then detects the angular velocity, and mechanical camera shake correction means for, in accordance with the output of the angular velocity sensor, driving at least one of a plurality of optical members of a photographing system of a camera, the one of the plurality of optical members being arranged so as to be freely movable. The present camera shake correction system further includes means which, in accordance with the detect output of the above picture image sensor or the respective detect outputs of the picture image sensor and angular velocity sensor, decides at least one of the following, tilting and panning operations of the camera and, in accordance with the operation decided, prohibits at least one of the camera shake corrections to be made by the above-mentioned electronic and mechanical camera shake correction means or prohibits a camera shake correction in a given direction.

Further, in order to attain the above objects, according to the invention, there is provided a camera shake correction system which comprises a picture image sensor for detecting the amount of parallel movements of a following picture image with respect to a leading picture image in accordance with picture image data between fields, an angular velocity sensor which, if an angular velocity produced with the shake of a camera is applied thereto, then detects the angular velocity, electronic camera shake correction means for moving parallel a picture image to be output by the amount of parallel movements detected by the picture image sensor in the opposite direction, mechanical camera shake correction means for, in accordance with the output of the angular velocity sensor, driving at least one of a plurality of optical members, a photographing system of a camera, the one of the plurality of optical members being arranged so as to be freely movable, and means which, when the angular velocity detected by the angular velocity sensor is smaller than a preset value, then allows only the electronic camera shake correction means to operate and, when the detected angular velocity is larger than the preset value, then allows only the mechanical camera shake correction means or both of the mechanical and electronic camera shake correction means to operate.

According to an embodiment of the invention, there are provided mechanical camera shake correction means as well as electronic camera shake correction means. The mechanical camera shake correction means is able to provide a greater correction range when compared with the electronic camera shake correction means, so that it can cover the defects of the electronic camera shake correction means. Also, the mechanical camera shake correction means employs as a camera shake sensor a picture image sensor used in the electronic camera shake correction means and thus eliminates the need for provision of an expensive angular velocity sensor for detecting the angular velocity of a camera.

According to another embodiment of the invention, angular velocity zero decision means is used to detect the amount of parallel movements of a following picture image per unit time with respect to a leading picture image in accordance with picture image data between fields and, when the detected amount of parallel movements is equal to or smaller than a predetermined threshold value, the angular velocity is decided as zero. Thanks to this, the zero state of the angular velocity can be decided accurately, the output signal of an angular velocity sensor can be taken in as an off-set signal at the time of decision of the zero angular velocity, and the output signal of the angular velocity sensor can be corrected by the off-set signal before it is output. This allows a more highly accurate detection of the angular velocity to thereby enhance a correction effect.

According to still another embodiment of the invention, there are provided electronic camera shake correction means for making a camera shake correction in accordance with the output of a picture image sensor as well as mechanical camera shake correction means for making a camera shake correction in accordance with the output of an angular velocity sensor. This embodiment is also arranged to decide at least one of the camera following, tilting and panning operations in accordance with the output of the picture image sensor or in accordance with the outputs of the picture image sensor and angular velocity sensor. And, the electronic and mechanical camera shake correction means are controlled according to the thus decided operation.

According to yet another embodiment of the invention, there are electronic and mechanical camera shake correction means as well as picture image and angular velocity sensors. This makes it possible to detect a wide range of angular velocities from small to large angular velocities. Also, since the mechanical camera shake correction means is able to cover a greater correction range over the electronic camera shake correction means while the electronic camera shake correction means is able to make a better correction with respect to the camera shake of small angular velocities when compared with the mechanical camera shake correction means, the two correction means can be used properly to thereby fill up the respective difficult-to-make corrections of them and also to eliminate the waste of the power consumption.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

Detailed description will hereunder be given of the preferred embodiments of a camera shake correction system according to the present invention with reference to the accompanying drawings.

Figure 1:
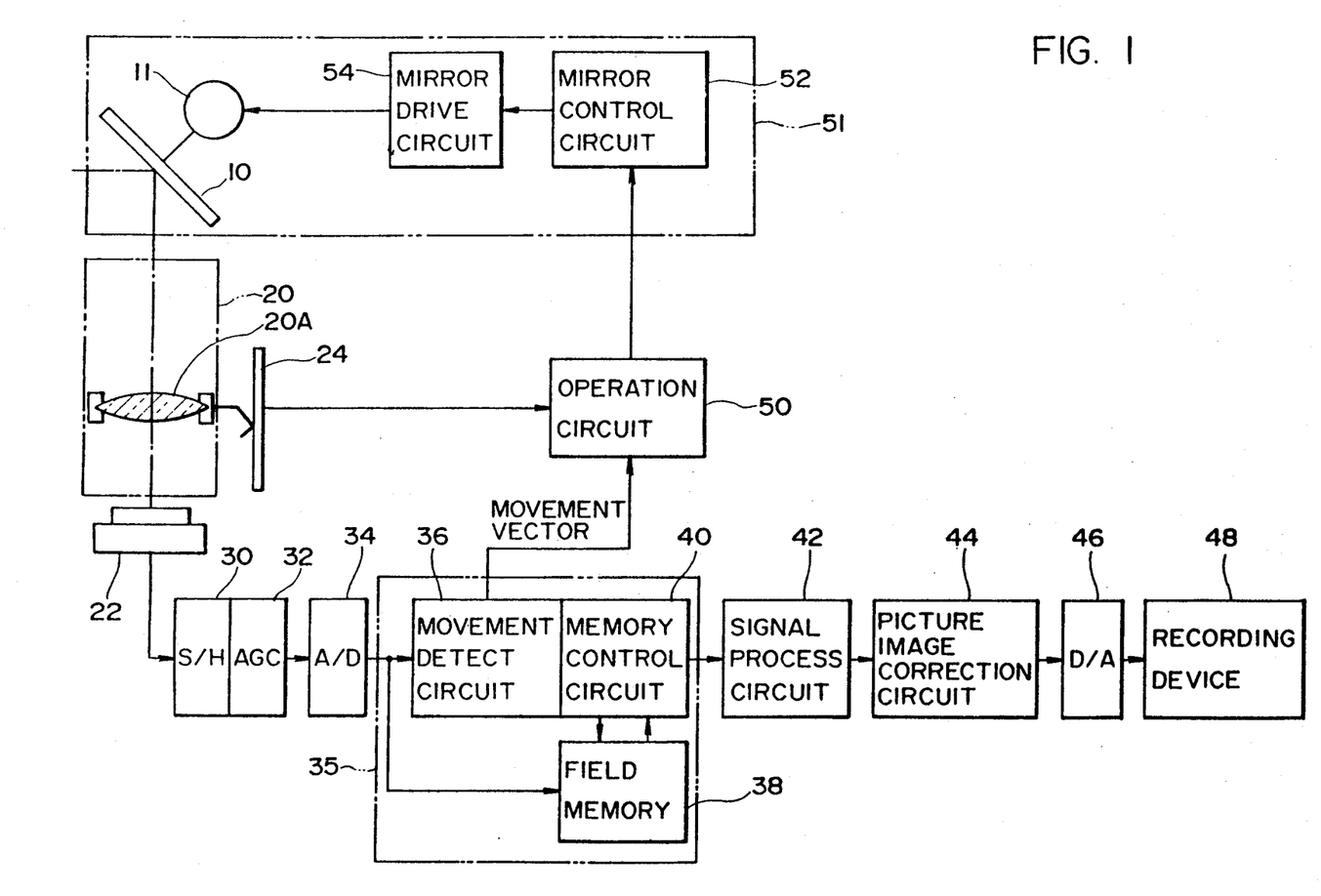
FIG. 1 is a block diagram of a first embodiment of a video camera incorporating therein a camera shake correction system according to the invention.

Referring first to FIG. 1, there is shown a block diagram of a first embodiment of a video camera incorporating therein a camera shake correction system according to the invention.

The illustrated shake correction system of a video camera includes an electronic camera shake correction part 35 and a mechanical camera shake correction part 51 and the electronic camera shake correction part 35 is mainly composed of a movement detect circuit 36, a field memory 38 and a memory control circuit 40.

As shown in FIG. 1, the light of an object to be photographed (which is hereinafter referred to as object light) enters through a correction mirror 10, a taking lens 20 and a solid state image pickup device (CCD) 22 and is converted by the respective sensors of the CCD 22 into signal charges the quantities of which correspond to the intensity of the light. The signal charges are read out sequentially and output through a sample-and-hold circuit 30 and an automatic gain control circuit 32 to an A/D converter 34.

The A/D converter 34 in turn converts the analog signals input therein into digital signals (picture image data), and outputs the digital signals to the movement detect circuit 36 and field memory 38.

The field memory 38 in turn stores the picture image data corresponding to 1 field and outputs the picture image data delayed by a period of 1 field. At the time of outputting such picture image data, a read-out area (a frame to be cut out from a screen) within 1 field to be output is controlled by the memory control circuit 40, which will be discussed later.

The movement detect circuit 36 compares the picture image data in the movement detect area of the current field with the picture image data in the movement detect area of the previous field applied through the field memory 38 and memory control circuit 40 to find the direction and quantity of the movements between fields (that is, difference movement vector). Here, to find the difference movement vector, a correlation between the respective picture image data in the movement detect areas of the two successive fields is operated to obtain a correlation value, and an amount of shift (an amount of parallel movement) is found that corresponds to the greatest correlation value.

Then, the difference movement vectors between the respective fields obtained in the above-mentioned manner are then integrated from the beginning of the camera shake correction to thereby find the amount of parallel movement of the current picture image with respect to a reference picture image at the time of the beginning of the camera shake correction, that is, an integrated movement vector (which is hereinafter referred to simply as a movement vector).

Figure 2:
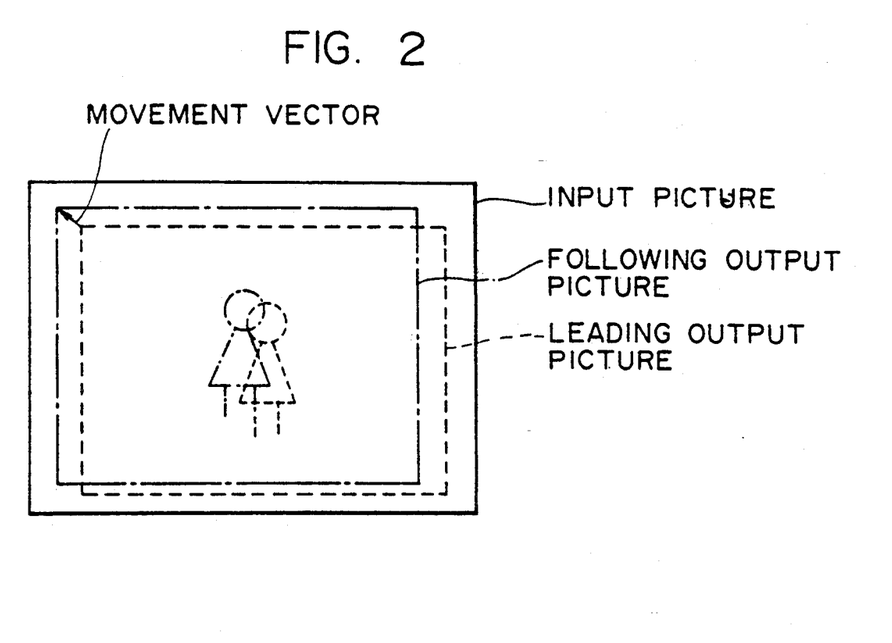
FIG. 2 is an explanatory view to show the processing contents of an electronic camera shake correction part employed in FIG. 1.

The memory control circuit 40 controls a picture cut-out frame to be output from the field memory 38 in such a manner that the movements of the picture can be cancelled in accordance with the movement vectors detected by the movement detect circuit 36. That is, as shown in FIG. 2, In the following output picture shown by a one-dot chained line with respect to a leading output picture shown by a broken line, the cut-out frame is controlled according to the movement vector detected, so that the following output picture can be moved parallel in the opposite direction of the movement for correction of the camera shake. Here, in order to eliminate the possibility that the end portion of the picture can be cut during such parallel movement, the output picture is previously set so as to be smaller in size than the input picture.

The picture image data read out from the field memory 38 in the above-mentioned manner is applied through the memory control circuit 40 to a signal process circuit 42, in which signal processings such as a white balance correction, brightness signal/chroma signal separation are applied on the picture image data. After such signal processings, the picture image data is output from the signal process circuit 42 to a picture image correct circuit 44.

The picture image correct circuit 44 is used to perform an electronic zooming operation in such a manner that the output picture read out from the field memory 38 can be of the same size as the input picture. That is, the circuit 44 enlarges a signal input therein by means of interpolation and then outputs the enlarged signal through a D/A converter 46 to a recording device 48.

The recording device 48, which includes a recording signal process circuit, converts a video signal input from the D/A converter 46 into a recording signal suitable for magnetic recording, and outputs the recording signal to a magnetic head so that the recording signal can be magnetically recorded into a video tape.

Next, description will be given below of the mechanical camera shake correction part 51 of the video camera. The mechanical camera shake correction part 51 is mainly composed of a correction mirror 10, a bimorph driver 11, a mirror control circuit 52 and a mirror drive circuit 54.

Here, at first, the drive mechanism of the correction mirror 10 will be described in brief.

Figure 3:
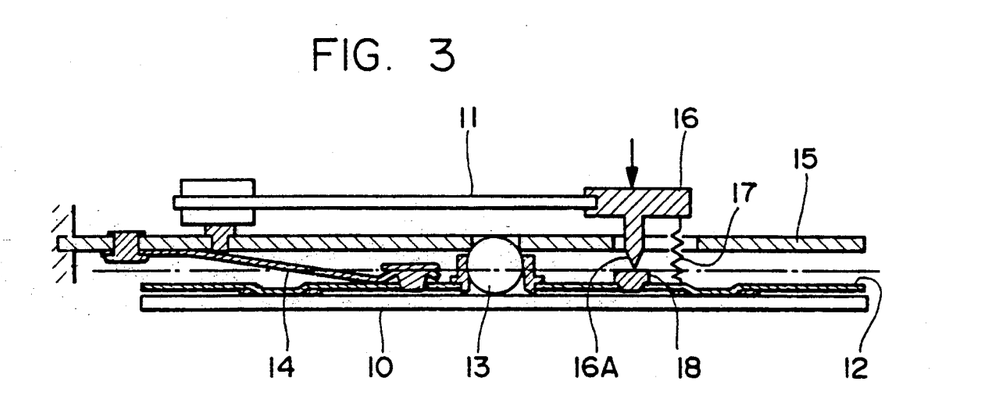
FIG. 3 is a section view of the details of a mirror drive mechanism in a mechanical camera shake correction part in FIG. 1.

In FIG. 3, the correction mirror 10 is bonded to a mirror base plate 12 which is in turn pressed against a chassis 15 through a ball 13 by four plate springs 14 (in FIG. 3, only one of them is shown) and is maintained by the energization force of the plate springs 14 at a neutral position where it is parallel to the chassis 15. Due to this, the mirror base plate 12, that is, the correction mirror 10 is supported in such a way that it can be inclined in all directions with respect to the chassis 15.

One end of the bimorph driver 11 is fixed to the chassis 15, while the other end thereof mounts a drive member 16 having a drive pin 16A. A coil spring 17 is interposed between the drive member 16 and mirror base plate 12 so that the tip end of the drive pin 16A can always be in contact with a cover member 18 disposed on the mirror base plate 12.

According to the mirror drive mechanism constructed in the above-mentioned manner, if the bimorph driver 11 is driven and its tip end is shifted, then the drive member 16 is moved in a direction of an arrow in FIG. 3 to thereby vary the clearance between the chassis 15 and correction mirror 10. That is, the correction mirror 10 is inclined with the center of the ball 13 as a reference.

Next, description will be given of the control system of the above-mentioned bimorph driver 11.

An operation circuit 50 inputs vector information indicating the movement vectors from the movement detect circuit 36 and at the same time inputs from a zoom encoder 24 zoom information indicating the moving positions (zoom position) of a magnification varying portion 20A of the taking lens 20. If at least one of the X and Y direction components of the movement vector reaches a preset value (for example, a limit value that can be corrected by the electronic camera shake correction part) in each direction, then the operation circuit 50 becomes operable, calculates the angular velocities in the panning direction (X direction) and in the tilting direction (Y direction) of the video camera in accordance with the above-mentioned vector information, zoom information and sampling cycle, and then outputs to the mirror control circuit 52 signals respectively indicating the thus calculated angular velocities.

The mirror control circuit 52 inputs the angular velocity signal from the operation circuit 50 at a given cycle, obtains a pulse rate proportional to the magnitude of the angular velocity thereof, and outputs to the mirror drive circuit 54 a pulse signal having the thus obtained pulse rate until it inputs the next angular velocity signal. As a result of this, a pulse of a pulse rate proportional to the angular velocity is applied to the mirror drive circuit 54.

The mirror drive circuit 54 amplifies the pulse signal input therein and applies electric charges into the bimorph driver 11. That is, the mirror drive circuit 54 applies pulse charges each having a given magnitude at intervals corresponding to the pulse rate of the pulse signal input therein.

As a result of this, the bimorph driver 11 is supplied with the amounts of the electric charges proportional to the angular velocities and thus the bimorph driver 11 is shifted in proportion to the amount of the electric charge supplied to thereby incline the correction mirror 10. Also, if the sign of the angular velocity signal input from the operation circuit 50 is inverted, then the polarity of the pulse signal output from the mirror control circuit 52 is also inverted, so that the bimorph driver 11 is shifted in the opposite direction. Because these operations are executed repeatedly at short cycles, the correction mirror 10 is inclined at an angular velocity proportional to the angular velocity calculated by the operation circuit 50.

The gains and the like of the mirror drive circuit 54 are previously adjusted in such a way that the correction mirror 10 can be inclined in the opposite direction at a half angular velocity of the angular velocity calculated. Also, if the movement vector detected by the movement detect circuit 36 is caused to go below a predetermined amount by the inclining movement of the correction mirror 10, then the angular velocity signal is not output any longer from the operation circuit 50 and, after then, the camera shake correction is made only by the electronic camera shake correction part 35.

In other words, if the movement vector reaches the limit value that can be corrected only by the electronic camera shake correction part 35 while the camera shake correction is being executed only by the electronic camera shake correction part 35, then the mechanical camera shake correction part 51 is used to correct the camera shake such that the movement vector thereof is decreased, and after then the camera shake correction is executed only by the electronic camera shake correction part 35 again.

In the above-mentioned embodiment, each time the movement vector reaches the limit value that can be corrected only by the electronic camera shake correction part 35, the mechanical camera shake correction part 51 is operated. However, the mechanical camera shake correction part 51 may be always in operation to thereby prevent the movement vector from increasing.

Figure 4:
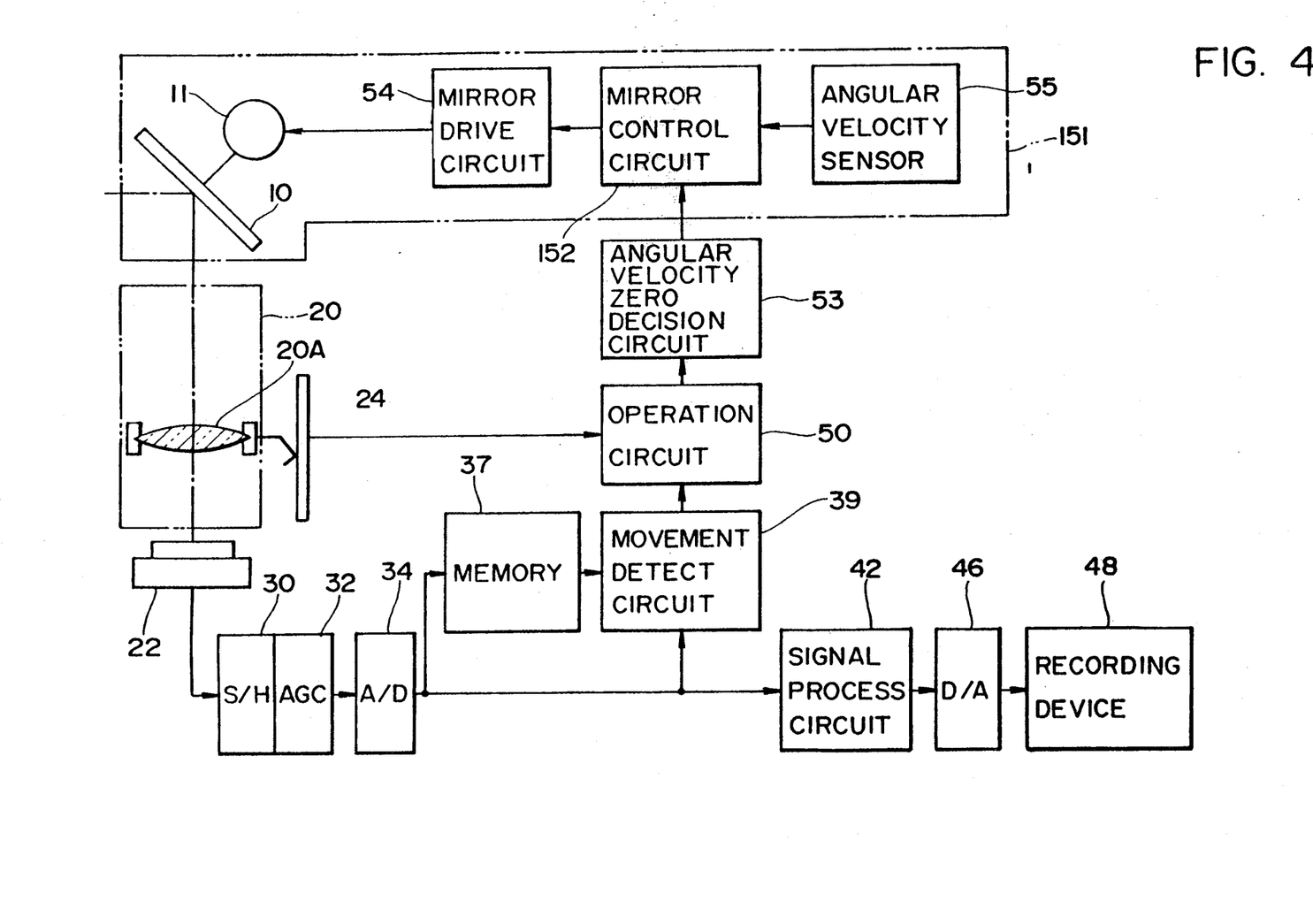
FIG. 4 is a block diagram of a second embodiment of a video camera incorporating therein a camera shake correction system according to the invention.

Referring now to FIG. 4, there is shown a block diagram of a second embodiment of a video camera incorporating a camera shake correction system according to the invention, in which parts used in common with the first embodiment shown in FIG. 1 are given the same designations and the detailed description thereof is omitted here.

The second embodiment does not include an electronic camera shake correction part as in the first embodiment, but performs the camera shake correction only by use of a mechanical camera shake correction part 151 having a correction mirror 10.

The picture image data converted by the A/D converter 34 are applied to the signal process circuit 42 and also to a memory 37 and a movement detect circuit 39. The memory 37 stores the picture image data in a given movement detect area in 1 field and outputs the picture image data to a movement detect circuit 39, delayed by a period of 1 field.

The movement detect circuit 39 compares the picture image data in the movement detect area of the current field with the picture image data in the movement detect area of the previous field applied through the memory 37 to thereby find the direction and quantity of the movement between the fields (that is, a difference movement vector). The thus found difference movement vector between the fields, that is, the vector information indicating the amount of parallel movement per unit time (namely, for a period of 1 field) is output to the operation circuit 50.

The operation circuit 50 inputs the above-mentioned vector information and inputs from the zoom encoder 24 the zoom information indicating the movement position (zoom position) of the magnification varying portion 20A of the taking lens 20. Then, the operation circuit 50 calculates the angular velocities in the panning direction (X direction) and in the tilting direction (Y direction) of the video camera in accordance with the above-mentioned vector information, zoom information and sampling cycles, and outputs to an angular velocity zero decision circuit 53 a signal representing the thus calculated angular velocity.

The angular velocity zero decision circuit 53 decides whether the angular velocities in the X and Y directions applied from the operation circuit 50 are equal to or less than a previously set threshold value (a predetermined value which indicates that the angular velocity is substantially zero) by directions and, if it is decided that the angular velocities are equal to or less than the threshold value, then outputs to a mirror control circuit 152 of a mechanical camera shake correction part 151 a detect signal indicating that the zero angular velocity is detected.

Next, description will be given of the mirror control circuit 152 of the mechanical camera shake correction part 151.

Figure 5:
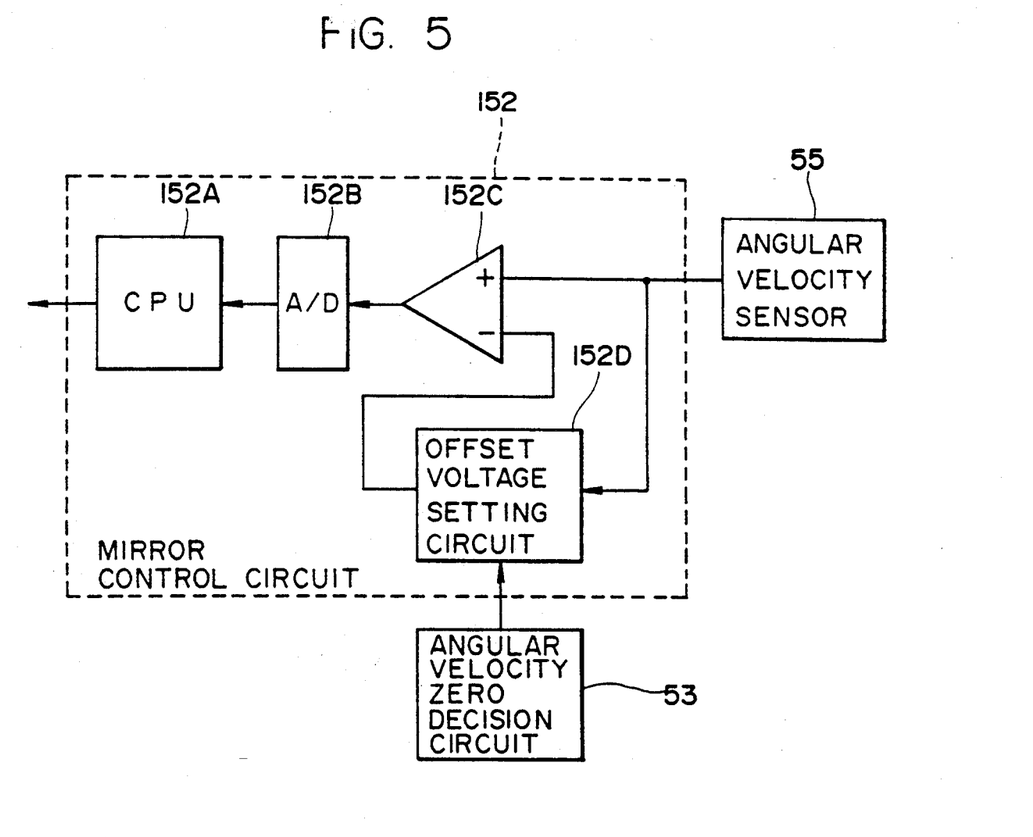
FIG. 5 is a block diagram of the details of a mirror control circuit in a mechanical camera shake correction part in FIG. 4.

As shown in FIG. 5, the mirror control circuit 152 comprises a central processing unit (CPU) 152A, an A/D converter 152B, an operational amplifier 152C and an off-set voltage setting circuit 152D and is constructed such that signals are applied thereto from an angular velocity sensor 55 and the above-mentioned angular velocity zero decision circuit 153.

The angular velocity sensor 55, which is a fork type of angular velocity sensor or the like, detects the torsion of a tuning fork due to Coriolis forces corresponding to angular velocities and outputs to the positive input of the operational amplifier 152C and also to the off-set voltage setting circuit 152D a voltage signal proportional to the detected torsion (angular velocity).

On inputting from the angular velocity zero decision circuit 53 the detect signal indicating that the zero angular velocity has been detected, the off-set voltage setting circuit 152D becomes operable and thus the circuit 152D takes in as an off-set voltage the voltage signal input from the angular velocity sensor 55, outputs the voltage signal to the negative input of the operational amplifier 152C. When the detect signal is not input therein from the angular velocity zero decision circuit 53, then the off-set voltage setting circuit 152D outputs the latest voltage signal taken in from the angular velocity sensor 55.

The operational amplifier 152C subtracts the off-set voltage set by the off-set voltage setting circuit 152D from the voltage signal applied from the angular velocity sensor 55, outputs the subtracted voltage signal to the A/D converter 152B, which in turn converts the voltage signal input therein into a digital signal and then outputs the digital signal (A/D converted value) to the CPU 152A.

The CPU 152A inputs the A/D converted value from the A/D converter 152B at given cycles, finds a pulse rate proportional to the magnitude of the A/D converted value (angular velocity), and outputs to the mirror drive circuit 54 (FIG. 4) a pulse signal of the thus found pulse rate until the next A/D converted value is input. As a result of this, the pulse of the pulse rate proportional to the angular velocity is applied to the mirror drive circuit 54.

The mirror drive circuit 54 amplifies the pulse signal input therein and supplies the bimorph driver 11 with electric charges. That is, the mirror drive circuit 54 charges the electric charges each having a given magnitude at the intervals that correspond to the pulse rate of the pulse signal input therein.

As a result of this, the amount of electric charges proportional to the angular velocity is charged into the bimorph driver 11 and the bimorph driver 11 is shifted in proportion to the amount of electric charges charged thereinto to thereby incline the correction mirror 10. Responsive to this, the correction mirror 10 is inclined at an angular velocity proportional to the angular velocity of the video camera to stabilize the object light entering the taking lens 20.

Figure 6:
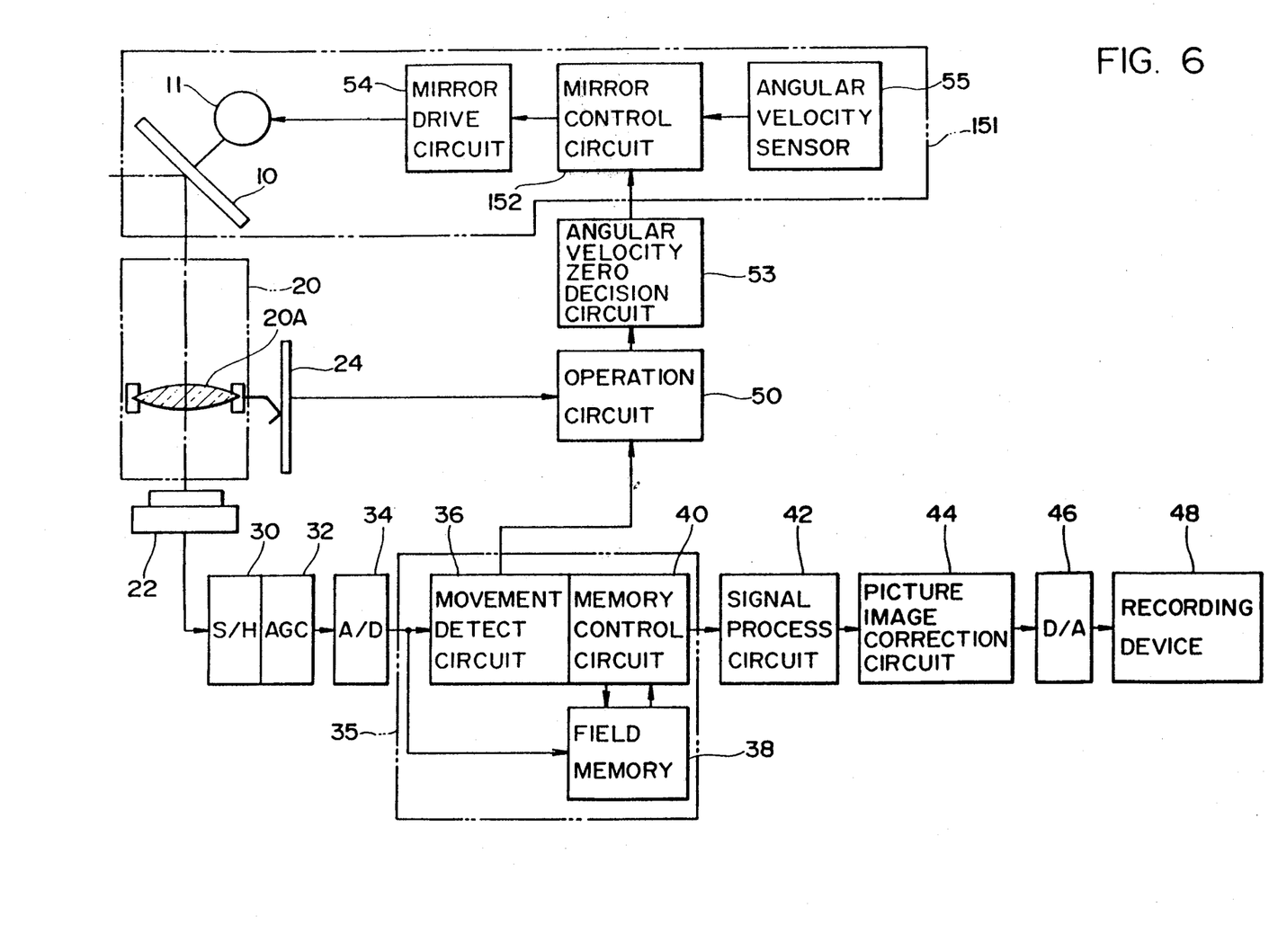
FIG. 6 is a block diagram of a third embodiment of a video camera incorporating therein a camera shake correction system according to the invention.

Referring now to FIG. 6, there is shown a block diagram of a third embodiment of a video camera incorporating a camera shake correction system according to the invention, in which parts used in common with the first embodiment shown in FIG. 1 and the second embodiment shown in FIG. 4 are given the same designations and the detailed description thereof is omitted here.

As shown in FIG. 6, the third embodiment is different from the second embodiment in that it includes such an electronic camera shake correction part 35 as shown in the first embodiment.

The shaking of a picture image due to the shake of the video camera is corrected by the mechanical camera shake correction part 151, but such correction involves delay. For this reason, the angular velocity applied from the movement detect circuit 36 or 39 through the operation circuit 50 to the angular velocity zero decision circuit 53 has a magnitude of a predetermined value or greater. That is, the angular velocity zero decision circuit 53 outputs a detect signal indicating the zero angular velocity only when the angular velocity input therein has a magnitude smaller than the above-mentioned predetermined value (namely, the angular velocity obtained only when the video camera itself is scarcely shaken).

Also, although in the above-mentioned embodiment only one of the X and Y direction systems of the mechanical camera shake correction part 151 has been discussed, the correction part 151 actually has two independent control systems which respectively execute the X-direction and Y-direction camera shake corrections, and the angular velocity zero decision circuit 53 is also arranged such that it is able to decide the zero angular velocity by directions.

Figure 7:
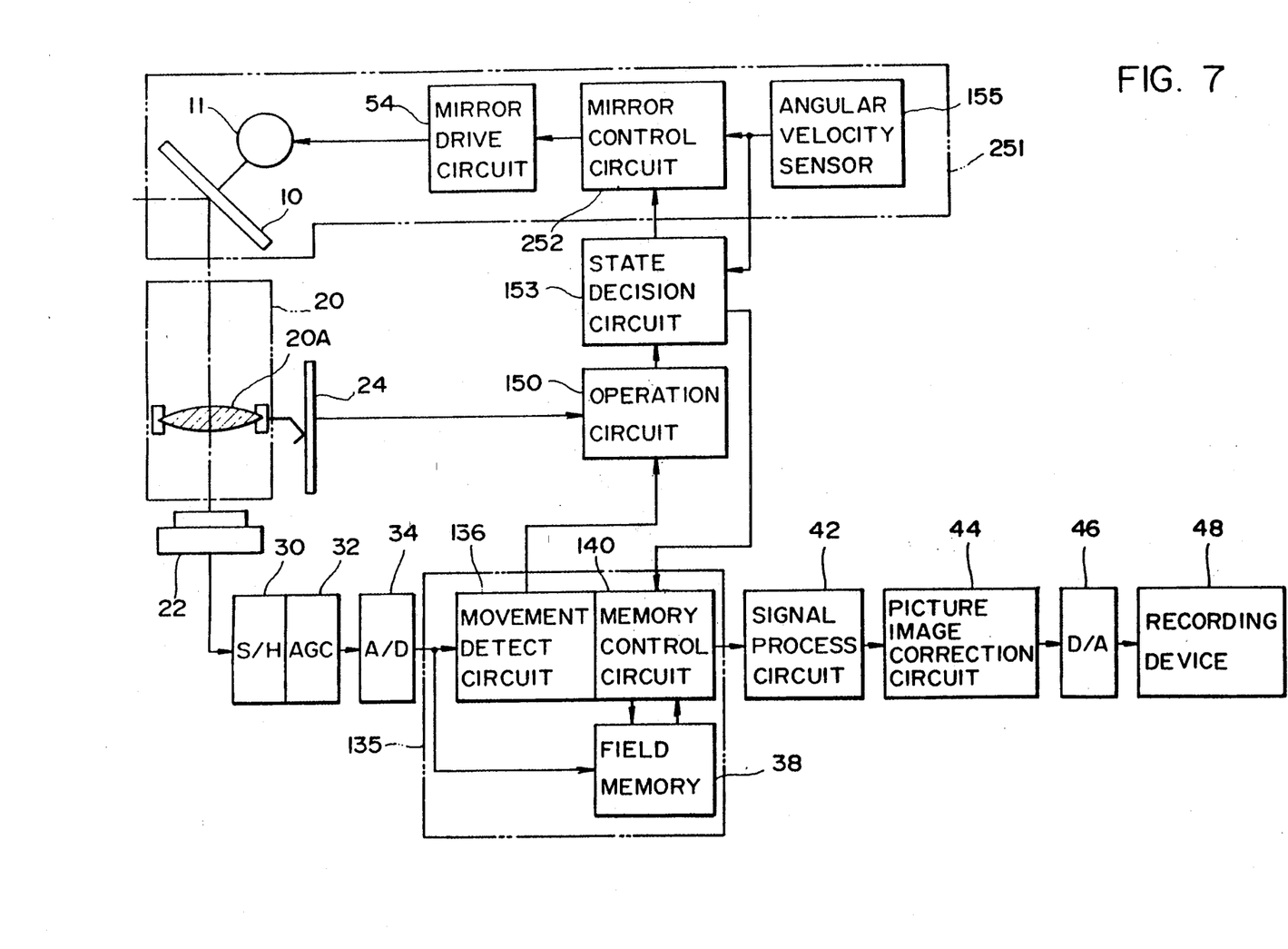
FIG. 7 is a block diagram of a fourth embodiment of a video camera incorporating therein a camera shake correction system according to the invention.

Referring now to FIG. 7, there is shown a block diagram of a fourth embodiment of a video camera incorporating a camera shake correction system according to the invention, in which parts used in common with the first embodiment shown in FIG. 1 are given the same designations and the detailed description thereof is omitted here.

Figure 8:
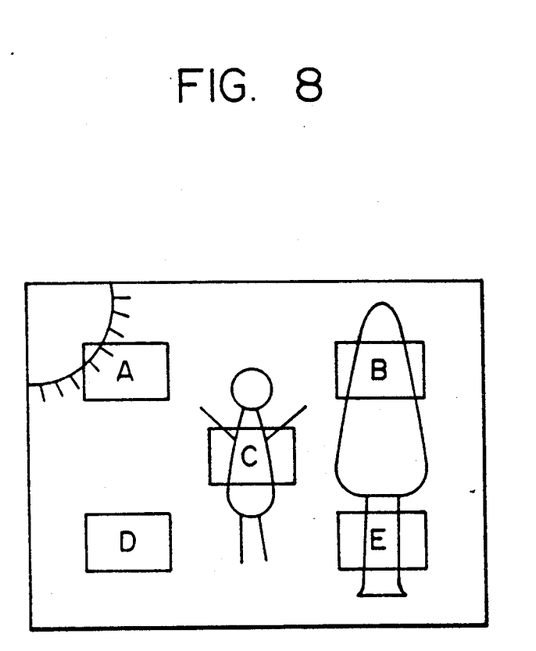
FIG. 8 is a view used to explain a movement detection area within 1 field.

A movement detect circuit 136 in an electronic camera shake correction part 135, as shown in FIG. 8, compares the picture image data in the five movement detect areas A-E of the current field with the picture image data in five movement detect areas A-E of the previous field applied through a field memory 38 and a memory control circuit 140 by the movement detect areas to thereby find the directions and amounts of the five movements between the fields (that is, five difference movement vectors). Then, one difference movement vector (for example, an average vector of the five difference movement vectors, or a selected vector to be discussed later) is obtained from the thus found five difference movement vectors between the fields, and the difference movement vector is integrated from the beginning of the camera shake correction to thereby find the amount of parallel movement of the current picture image with respect to a reference picture image obtained at the time of the beginning of the camera shake correction, that is, an integrated movement vector (which is hereinafter referred to simply as a movement vector).

The memory control circuit 140, similarly as in the memory control circuit 40 shown in FIG. 1, controls a picture cut-out frame to be output from the field memory 38 in accordance with the movement vector detected by the movement detect circuit 136 in such a manner that the movements of a picture can be cancelled. By means of this control, the camera shake correction can be executed electronically in a similar manner to the electronic camera shake correction part 35 shown in FIG. 1.

Next, description will be given below of a mechanical camera shake correction part 251.

An angular velocity sensor 155, similarly to the angular velocity sensor 55 shown in FIG. 4, may be a fork type of angular velocity sensor which detects the torsion of a fork due to the Coriolis forces corresponding to the angular velocities and outputs to a mirror control circuit 252 a voltage signal proportional to the detected torsion (angular velocity).

The mirror control circuit 252 inputs the voltage signal from the angular velocity sensor 155 at given cycles, finds a pulse rate proportional to the magnitude of the voltage signal (angular velocity), and outputs a pulse signal of the pulse rate to the mirror drive circuit 54 until the next voltage signal is input therein. In this manner, the pulse of the pulse rate proportional to the angular velocity is applied to the mirror drive circuit 54.

The mirror drive circuit 54 amplifies the pulse signal input and supplies the bimorph driver 11 with electric charges. That is, the mirror drive circuit 54 charges pulse electric charges each having a given magnitude at the intervals that correspond to the pulse rate of the pulse signal input. In this way, an amount of electric charges proportional to the angular velocity is charged into the bimorph driver 11 and, responsive to this, the bimorph driver 11 is shifted in proportion to the amount of electric charges supplied, thereby causing the correction mirror 10 to incline.

In this way, the correction mirror 10 is inclined at the angular velocity proportional to the angular velocity of the video camera to thereby stabilize the object light entering the taking lens 20.

Next, description will be given below of the operation of an operation circuit 150 and a state decision circuit 153 respectively shown in FIG. 7.

The operation circuit 150 inputs from the movement detect circuit 136 the vector information indicating the five difference movement vectors and also inputs from the zoom encoder 24 the zoom information indicating the movement position (zoom position) of the magnification varying portion 20A of the taking lens 20. In accordance with the five vectors information, zoom information and sampling cycles, the operation circuit 150 calculates five angular velocities respectively with respect to the panning direction (X direction) and tilting direction (Y direction) of the video camera, and outputs these angular velocities to the state decision circuit 153.

To another input of the state decision circuit 153 are applied from the angular velocity sensor 155 signals which respectively indicate the angular velocities in the camera panning and tilting directions.

Figure 9:
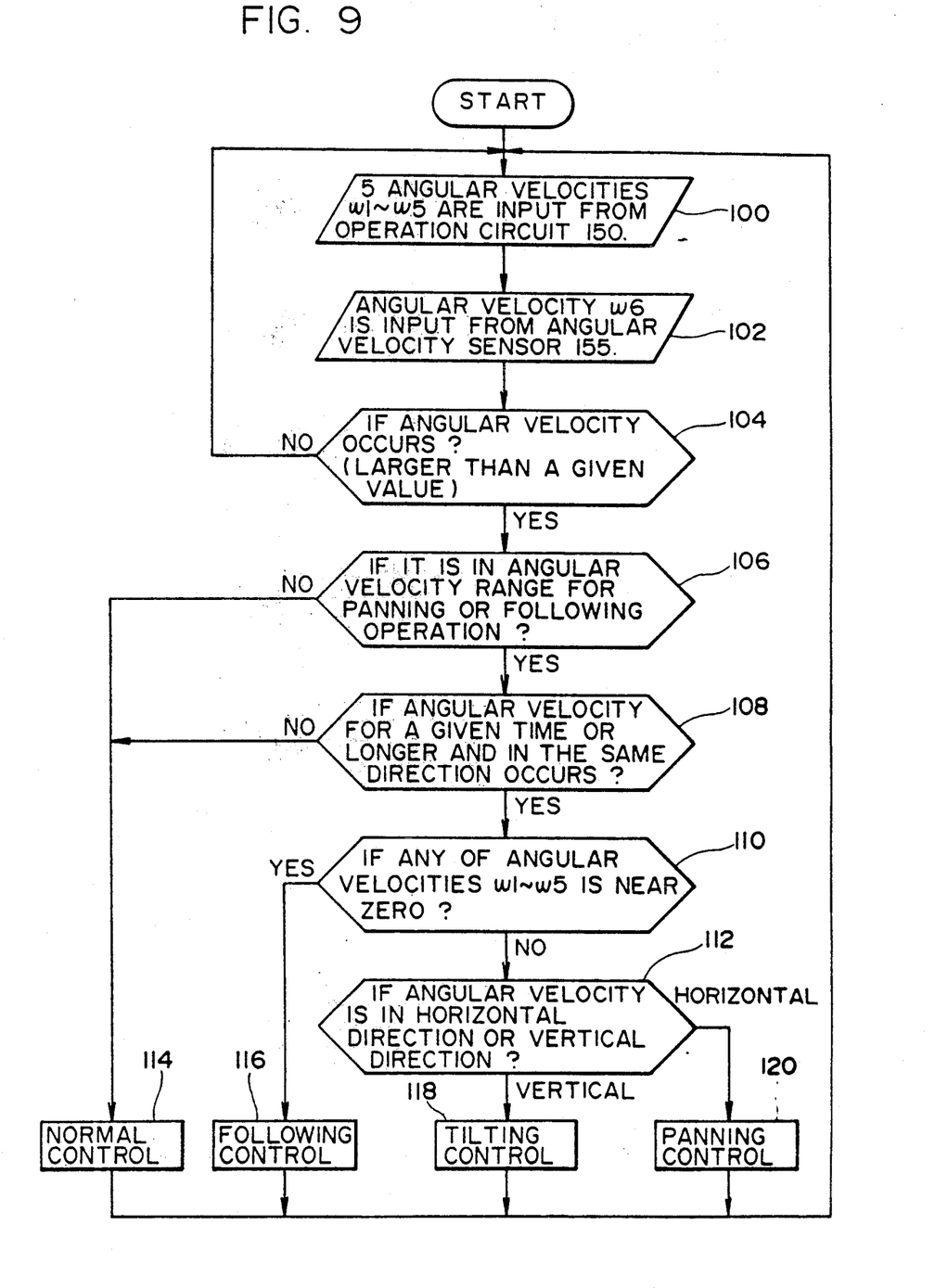
FIG. 9 is a flow chart used of explain a state decision circuit in FIG. 7

The state decision circuit 153, as shown in FIG. 9, inputs from the operation circuit 150 the signals respectively indicating the above-mentioned five angular velocities ω1–ω5 and also inputs from the angular velocity sensor 155 a signal indicating an angular velocity ω6 (Steps 100, 102). And, only when these angular velocities are of a predetermined value or greater which indicates the presence of the camera shake (step 104), the camera shake correction to be discussed later can be executed.

In other words, it is checked whether the angular velocities detected are within a range of the angular velocities for the camera panning, following and other operations or not (Step 106). If the detected angular velocities are out of the range of the angular velocities for the panning and other operations of the camera, then the program advances to Step 114, in which a normal camera shake correction (normal control) is executed. Here, the normal control means a control in which the electronic camera shake correction part 135 and mechanical camera shake correction part 251 are normally operated, respectively. It should be noted here that the angular velocity generated by the panning or other operations of the camera is smaller than the angular velocity caused by the camera shake.

On the other hand, when the detected angular velocity is within the range of the angular velocities for the panning and other operations of the camera, then the program advances to Step 108, in which it is checked whether an angular velocity in the same direction is being produced for a given period of time or longer or not. If the angular velocity in the same direction is not being produced for a given period of time or longer, then it is decided that a slow camera shake is occurring and thus the normal control (Step 114) is executed. On the contrary, if the angular velocity is occurring in the same direction and for a given period of time or longer, then the program advances to Step 110.

In Step 110, it is checked whether any of the five angular velocities ω1–ω5 input from the operation circuit 150 are near to zero or not. And, if there exist angular velocities near to zero, then it is decided that the camera is in the operation of following a main object, and thus the camera following control is executed (Step 116). Here, the following control means a control which allows only the electronic camera shake correction part 135 to operate and prohibits the camera shake correction by the mechanical camera shake correction part 251.

On the other hand, if any angular velocities near to zero are not included in the five angular velocities ω1–ω5, then the program advances to Step 112, in which it is checked whether the detected angular velocity is in a horizontal direction or in a vertical direction. For the vertical direction, a tilting control is executed, while for the horizontal direction a panning control is carried out (Steps 118, 120). Here, the tilting control means a control which allows the electronic camera shake correction part 135 and mechanical camera shake correction part 251 to execute a camera shake correction only in the panning direction and prohibits them from executing a camera shake correction in the tilting direction; and, the panning control means a control which allows the electronic camera shake correction part 135 and mechanical camera shake correction 251 to execute a camera shake correction only in the tilting direction and prohibits them from executing a camera shake correction in the panning direction.

Figure 10:
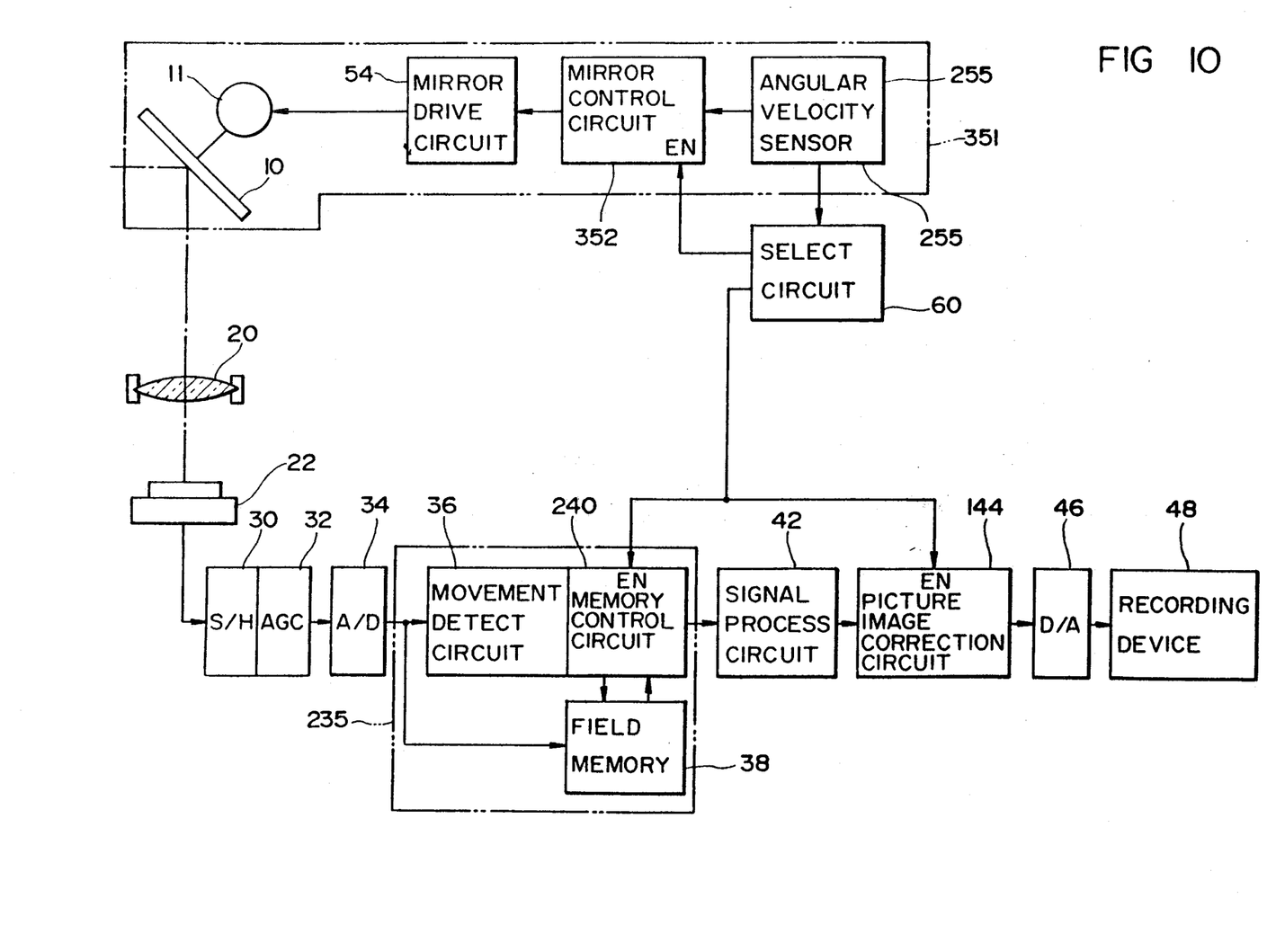
FIG. 10 is a block diagram of a fifth embodiment of a video camera incorporating therein a camera shake correction system according to the invention; and, FIG. 11 is a block diagram of a sixth embodiment of a video camera incorporating therein a camera shake correction system according to the invention.

Referring now to FIG. 10, there is shown a block diagram of a fifth embodiment of a video camera incorporating a camera shake correction system according to the invention, in which parts used in common with the first embodiment shown in FIG. 1 are given the same designations and the detailed description thereof is omitted here.

As shown in FIG. 10, the present camera shake correction system comprises an electronic camera shake correction part 235 and a mechanical camera shake correction part 351. In this camera shake correction system, the camera shake correction can be executed by the respective correction parts 235 and 351 independently of each other. Also, the correction system further includes a select circuit 60 which is used to make operable only one or both of the two correction parts.

The select circuit 60 inputs from an angular velocity sensor 255 a voltage signal proportional to an angular velocity, and checks whether the angular velocity is smaller than a preset value (a minimum value that can be detected accurately by the angular velocity sensor 255, for example, 1°/sec. ) or not. And, if it is found that the angular velocity is smaller than the preset value, then the select sensor 60 outputs an enable signal "1" to the EN terminal of a memory control circuit 240 of the electronic camera shake correction part 235 and also to the EN terminal of an picture image correction circuit 144 to thereby enable the electronic camera shake correction part 235, and at the same time outputs a disable signal "0" to the EN terminal of a mirror control circuit 352 of the mechanical camera shake correction part 351 to thereby disable the mechanical camera shake correction part.

On the other hand, if it is found that the angular velocity is greater than the preset value, then the select circuit 60 outputs the disable signal to the EN terminal of the memory control circuit 240 of the electronic camera shake correction part 235 and also to the EN terminal of the picture image correction circuit 144 to thereby disable the electronic camera shake correction part, and at the same time outputs the enable signal to the EN terminal of the mirror control circuit 352 of the mechanical camera shake correction part 351.

In this way, if the angular velocity is found smaller than the preset value, then only the electronic camera shake correction is carried out and, if it is greater than the preset value, then only the mechanical camera shake correction is carried out.

Figure 11:
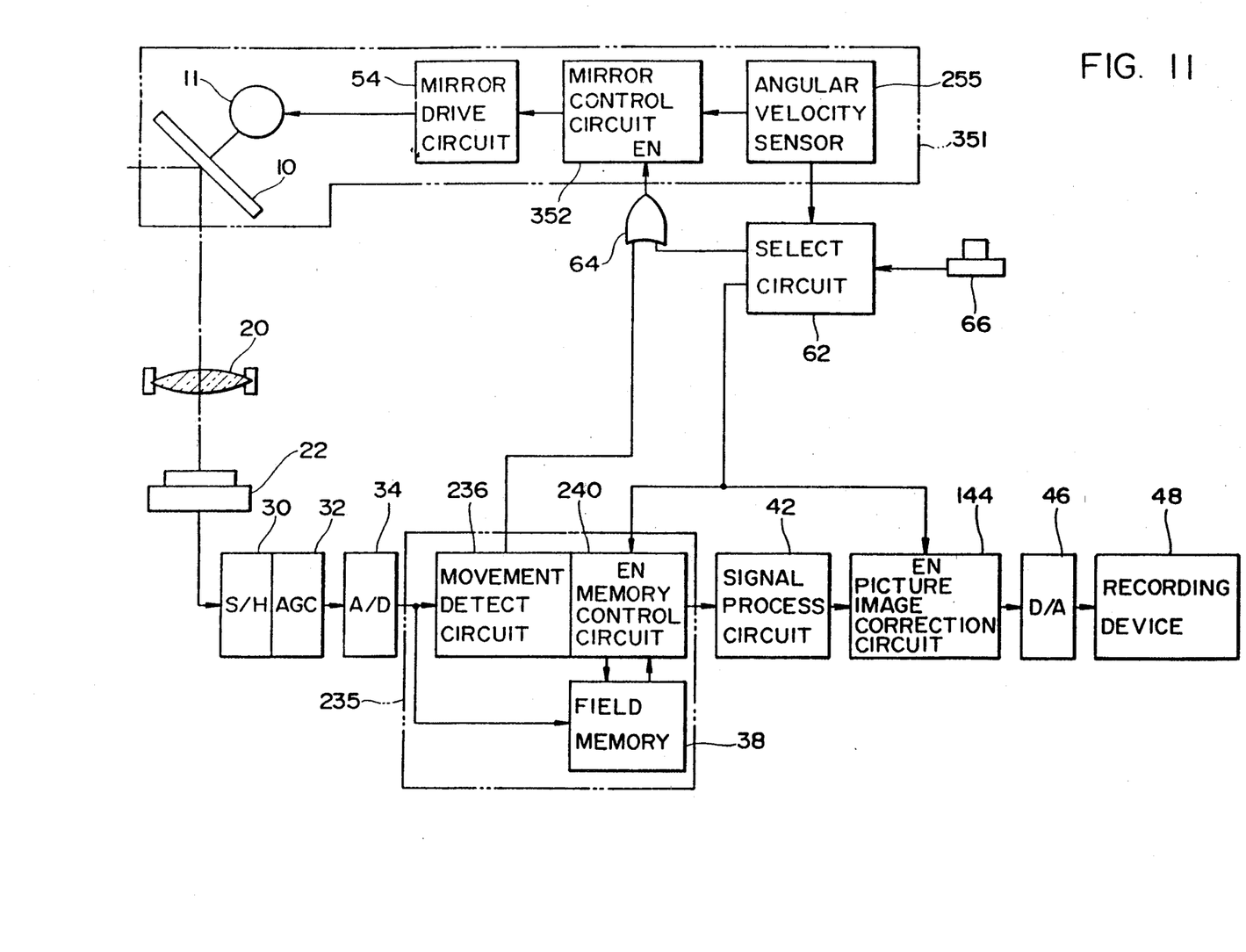

Referring now to FIG. 11, there is shown a block diagram of a sixth embodiment of a video camera incorporating a camera shake correction system according to the invention, in which parts used in common with the fifth embodiment shown in FIG. 10 and the detailed description thereof is omitted here.

The sixth embodiment shown in FIG. 11 is different from the fifth embodiment shown in FIG. 10 mainly in that it additionally includes an OR circuit 64 and a great shake switch 66.

As shown in FIG. 11, to one input of the OR circuit 64 is applied the enable signal "1" or disable signal "0" from the select circuit 62, as described before, and, at the limit time of the electronic camera shake correction, the enable signal "1" can be applied to the other input of the OR circuit 64 from a movement detect circuit 236.

In other words, if, while the camera shake correction is being executed only by the electronic camera shake correction part 235, the movement vector reaches the limit value that can be corrected only by the electronic camera shake correction part 235, then the movement detect circuit 236 outputs the enable signal "1" through the OR circuit 64 to the EN terminal of a mirror control circuit 352 so that the movement vector can be reduced by use of the mechanical camera shake correction part 351.

Also, the great shake switch 66 is used when a great camera shake is expected (for example, photographing is executed from aboard a vehicle). In particular, if the great shake switch 66 is turned ON, then the select circuit 62 makes the electronic and mechanical camera shake correction parts 235 and 351 respectively, irrespective of the magnitude of the angular velocity input.

Here, it should be noted that the invention is not limited to the illustrated first to sixth embodiments each using a correction mirror, but other mechanisms can be used, for example, the taking lens may be inclined, or the image pickup element may be moved. Also, other various kinds of methods than the controlling methods illustrated herein can be employed.

As has been described heretofore, according to the camera shake correction system of the present invention, a combination of electronic and mechanical camera shake correction means can make up for the mutual weak camera shake corrections. In other words, an accurate camera shake correction within 1 pixel can be realized by use of the electronic camera shake correction means and, even if a camera shake correction range only by the electronic camera shake correction means is reduced, the use of the mechanical camera shake correction means can provide a sufficient camera shake correction range, so that it is possible to reduce the rate of expansion of a picture due to electronic zooming and also to prevent the lowered picture quality due to the electronic zooming.

Also, by common use of the picture image sensor to detect from picture image data the amount of parallel movement (movement vector) of a following picture image with respect to a leading picture image, there is eliminated the need for provision of an expensive angular velocity sensor which has been necessary in the conventional mechanical camera shake correction means.

Further, due to the fact that the amount of parallel movement per unit time of a following picture image with respect to a leading picture image is detected from the picture image data and the zero angular velocity of a camera is decided in accordance with the detected amount of parallel movement, it is possible to detect accurately the output state of the zero angular velocity of an angular velocity sensor used in the mechanical camera shake correction means, which makes it possible to detect the angular velocity with high accuracy and thus to realize a highly accurate camera shake correction.

Moreover, a combined use of electronic and mechanical camera shake correction means can realize a wide camera shake correction ranging from a small angular velocity to a large angular velocity and, due to the fact that the following, tilting and panning operations of the camera are detected and a suitable control for the detected operation (partial prohibition of the camera shake correction), a good video image can be obtained under any photographing conditions.

In addition, a proper or selective use of the electronic and mechanical camera shake correction means can save the power consumption and is thus more economical when compared with the simultaneous use of the two correction means.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A shake correction system adapted for use with a camera having a photographing optical system having a plurality of optical members, comprising:
    a picture image sensor for detecting the amount of parallel movement of a following picture image with respect to a leading picture image in accordance with picture image data between fields or part of said picture image data;
    electronic camera shake correction means for moving a picture image to be output in a direction opposite and parallel to that of the parallel movement detected by said picture image sensor by the amount of parallel movement detected by said picture image sensor; and
    mechanical camera shake correction means for driving at least one of said plurality of optical members of said photographing optical system of said camera in accordance with the output of said picture image sensor, said at least one of said plurality of optical members being disposed within said camera such that said one of said plurality of optical members is freely movable, wherein said electronic camera shake correction means exclusively performs shake correction within a predetermined range of values of a movement vector between the following picture image and the leading picture image.

2. A shake correction system as set forth in claim 1, wherein said mechanical camera shake correction means drives said one of said plurality of optical members in a direction in which said amount of parallel movement detected by said picture image sensor becomes zero, if said amount of parallel movement reaches a preset value in a range correctable by said electronic camera shake correction means.

3. A shake correction system as set forth in claim 1, wherein said mechanical camera shake correction means drives said one of said plurality of optical members in a direction in which said amount of parallel movement detected by said picture image sensor becomes always zero.

4. A shake correction system adapted for use with a camera having a photographing optical system having a plurality of optical members, comprising:
    a picture image sensor for detecting the amount of parallel movement of a following picture image with respect to a leading picture image in accordance with picture image data between fields or part of said picture image data;
    electronic camera shake correction means for moving a picture image to be output in a direction opposite and parallel to that of the parallel movement detected by said picture image sensor by the amount of parallel movement detected by said picture image sensor;
    an angular velocity sensor for detecting an angular velocity produced by the shake of the camera, and for outputting a signal corresponding to said angular velocity; and
    mechanical camera shake correction means for driving at least one of said plurality of optical members of said photographing optical system of the camera in accordance with the output of said angular velocity sensor, said one of said plurality of optical members being disposed within said camera such that said one of said plurality of optical members is freely movable, wherein said electronic camera shake correction means exclusively performs shake correction within a predetermined range of values of a movement vector between the following picture image and the leading picture image.

5. A shake correction system as set forth in claim 4, further including means for deciding at least one of the following, tilting and panning operations of the camera in accordance with an output of said picture image sensor or respective outputs of said picture image sensor and said angular velocity sensor, and, according to the operations decided, prohibiting at least one of camera shake corrections to be made by said electronic shake correction means and said mechanical camera shake correction means or prohibiting a camera shake correction in a given direction.

6. A correction system adapted for use with a camera having a photographing optical system having a plurality of optical members, comprising:
a picture image sensor for detecting the amount of parallel movement of a following picture image with respect to a leading picture image in accordance with picture image data between fields;
electronic camera shake correction means for moving a picture image to be output in a direction opposite and parallel to that of the parallel movement detected by said picture image sensor by the amount of parallel movement detected by said picture image sensor;
an angular velocity sensor for detecting an angular velocity produced by the shake of the camera, and for outputting a signal corresponding to said angular velocity;
mechanical camera shake correction means for driving at least one of said plurality of optical members of said photographing optical system of the camera in accordance with the output of said angular velocity sensor, said one of said plurality of optical members being disposed within said camera such that said one of said plurality of optical members is freely movable; and
means for enabling only said electronic camera shake correction means when the angular velocity detected by said angular velocity sensor is smaller than a preset value and for enabling only said mechanical camera shake correction means or both of said mechanical camera shake correction means and said electronic camera shake correction means when said angular velocity detected is larger than said preset value.

7. A shake correction system adapted for use with a camera having a photographing optical system having a plurality of optical members, comprising:
a picture image sensor for detecting the amount of parallel movement of a following picture image with respect to a leading picture image in accordance with picture image data between fields;
electronic camera shake correction means for moving a picture image to be output in a direction opposite and parallel to that of the parallel movement detected by said picture image sensor by the amount of parallel movement detected by said picture image sensor;
an angular velocity sensor for detecting an angular velocity produced by the shake of the camera, and for outputting a signal corresponding to said angular velocity;
mechanical camera shake correction means for driving at least one of said plurality of optical members of said photographing optical system of the camera in accordance with the output of said angular velocity sensor, said one of said plurality of optical members being disposed within said camera such that said one of said plurality of optical members is freely movable; and
means for enabling only said electronic camera shake correction means when the angular velocity detected by said angular velocity sensor is smaller than a preset value, and for enabling only said mechanical camera shake correction means or both of said mechanical camera shake correction means and said electronic camera shake correction means when said angular velocity detected is larger than said preset value or when the amount of parallel movement detected by said picture image sensor exceeds a range that can be corrected by said electronic camera shake correction means.

8. A shake correction system adapted for use with a camera having a photographing optical system having a plurality of optical members, comprising:
a picture image sensor for detecting the amount of parallel movement of a following picture image with respect to a leading picture image in accordance with picture image data between fields;
electronic camera shake correction means for moving a picture image to be output in a direction opposite and parallel to that of the parallel movement detected by said picture image sensor by the amount of parallel movement detected by said picture image sensor;
an angular velocity sensor for detecting an angular velocity produced by the shake of the camera, and for outputting a signal corresponding to said angular velocity;
mechanical camera shake correction means for driving at least one of said plurality of optical members of said photographing optical system of the camera in accordance with the output of said angular velocity sensor, said one of said plurality of optical members being disposed within said camera such that said one of said plurality of optical members is freely movable;
means for enabling only said electronic camera shake correction means when the angular velocity detected by said angular velocity sensor is smaller than a preset value, and for enabling only said mechanical camera shake correction means when said angular velocity detected is larger than said preset value; and
switching means for enabling both of said electronic camera shake correction means and said mechanical camera shake correction means irrespective of the magnitude of the angular velocity detected by said angular velocity sensor.

* * * * *